US008282707B2

(12) United States Patent  
Bresler et al.

(10) Patent No.: US 8,282,707 B2
(45) Date of Patent: Oct. 9, 2012

(54) NATURAL GAS PURIFICATION SYSTEM

(75) Inventors: Leonid Bresler, Northbrook, IL (US); John M. Foresman, Homer Glen, IL (US); William I. Echt, Highwood, IL (US); Mark E. Schott, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 21 days.

(21) Appl. No.: 13/111,458

(22) Filed: May 19, 2011

(65) Prior Publication Data

US 2012/0000359 A1 Jan. 5, 2012

Related U.S. Application Data

(60) Provisional application No. 61/359,920, filed on Jun. 30, 2010.

(51) Int. Cl.
B01D 53/22 (2006.01)
(52) U.S. Cl. ............ 95/51; 95/45; 95/49; 95/90; 95/114
(58) Field of Classification Search ............... 95/45, 49, 95/51, 90, 114
See application file for complete search history.

(56) References Cited

U.S. PATENT DOCUMENTS

| | | | |
|---|---|---|---|
| 3,938,972 A | 2/1976 | Sugimura | |
| 4,604,988 A | 8/1986 | Rao | |
| 4,693,822 A | 9/1987 | Bowe et al. | |
| 4,783,203 A | 11/1988 | Doshi | |
| 4,863,492 A | 9/1989 | Doshi et al. | |
| 5,209,913 A | 5/1993 | Audeh et al. | |
| 5,326,385 A | 7/1994 | Rajani et al. | |
| 5,411,721 A | 5/1995 | Doshi et al. | |
| 5,486,227 A | 1/1996 | Kumar et al. | |
| 5,558,698 A | 9/1996 | Baker et al. | |
| 5,738,712 A | 4/1998 | Hyppanen | |
| 5,846,295 A | 12/1998 | Kalbassi et al. | |
| 6,128,919 A * | 10/2000 | Daus et al. ........................ | 62/624 |
| 6,197,269 B1 * | 3/2001 | Jansen et al. ............. | 423/243.01 |
| 6,203,599 B1 * | 3/2001 | Schubert et al. ................. | 95/172 |
| 6,579,343 B2 | 6/2003 | Brennecke et al. | |
| 6,782,714 B2 | 8/2004 | Iijima et al. | |
| 6,881,389 B2 | 4/2005 | Paulsen et al. | |
| 6,932,858 B2 | 8/2005 | Nicol et al. | |
| 7,025,803 B2 | 4/2006 | Wascheck et al. | |
| 7,047,764 B2 | 5/2006 | Sawchuk et al. | |
| 7,048,778 B2 * | 5/2006 | Gobina ............................. | 95/51 |
| 7,074,322 B2 | 7/2006 | Sawchuk et al. | |
| 7,083,662 B2 | 8/2006 | Xu et al. | |
| 7,114,351 B2 | 10/2006 | Jones, Jr. et al. | |
| 7,131,272 B2 | 11/2006 | Jones, Jr. et al. | |
| 7,147,691 B2 | 12/2006 | Palmer | |
| 7,155,918 B1 | 1/2007 | Shivers, III | |
| 7,168,265 B2 | 1/2007 | Briscoe et al. | |
| 7,231,784 B2 | 6/2007 | Howard et al. | |
| 7,243,510 B2 | 7/2007 | Jones, Jr. et al. | |
| 7,251,956 B2 | 8/2007 | Sawchuk et al. | |
| 7,314,503 B2 | 1/2008 | Landrum et al. | |
| 7,322,387 B2 | 1/2008 | Landry et al. | |
| 7,396,388 B2 | 7/2008 | Mitariten | |
| 7,424,999 B2 | 9/2008 | Xu et al. | |
| 7,425,314 B2 | 9/2008 | Van De Graaf | |
| 7,429,287 B2 | 9/2008 | Frantz | |
| 7,442,231 B2 | 10/2008 | Landrum | |
| 7,442,233 B2 | 10/2008 | Mitariten | |
| 7,500,370 B2 | 3/2009 | Coward | |
| 7,517,389 B2 | 4/2009 | Van De Graaf et al. | |
| 7,527,775 B2 | 5/2009 | Chinn et al. | |
| 7,537,641 B2 | 5/2009 | Lokhandwala et al. | |
| 7,575,624 B2 | 8/2009 | Cartwright et al. | |
| 7,591,149 B2 | 9/2009 | Ransbarger et al. | |
| 7,600,395 B2 | 10/2009 | Eaton et al. | |
| 7,803,215 B2 * | 9/2010 | Russell et al. ................... | 95/136 |
| 2002/0139244 A1 | 10/2002 | Ciccarelli | |
| 2004/0060334 A1 | 4/2004 | Palmer | |
| 2005/0129598 A1 | 6/2005 | Chinn et al. | |
| 2006/0090644 A1 | 5/2006 | Sirkar | |
| 2006/0201853 A1 | 9/2006 | Sawchuk et al. | |
| 2007/0240449 A1 | 10/2007 | Howard et al. | |
| 2008/0127655 A1 | 6/2008 | Landry et al. | |
| 2008/0210092 A1 | 9/2008 | Buckles et al. | |
| 2008/0229924 A1 | 9/2008 | Carlsson et al. | |
| 2009/0013697 A1 | 1/2009 | Landry et al. | |
| 2009/0099269 A1 | 4/2009 | Rigby et al. | |
| 2009/0130007 A1 | 5/2009 | Dickinson et al. | |
| 2009/0130009 A1 | 5/2009 | Kikkawa et al. | |
| 2009/0151562 A1 | 6/2009 | Russell et al. | |
| 2009/0158930 A1 | 6/2009 | Wagner et al. | |
| 2009/0205365 A1 | 8/2009 | Van Aken et al. | |
| 2010/0126347 A1 | 5/2010 | Maunder et al. | |
| 2010/0186586 A1 * | 7/2010 | Chinn et al. ........................ | 95/45 |
| 2011/0239700 A1 * | 10/2011 | Hasse et al. .................... | 62/617 |
| 2011/0239862 A1 | 10/2011 | Davydov | |
| 2011/0290111 A1 * | 12/2011 | Dunne et al. ...................... | 95/51 |

FOREIGN PATENT DOCUMENTS

| | | |
|---|---|---|
| EP | 1226860 A1 | 7/2002 |
| EP | 1710008 A1 | 10/2006 |
| EP | 1762294 A2 | 3/2007 |
| WO | 2007003618 A1 | 1/2007 |
| WO | 2007082896 A1 | 7/2007 |
| WO | 2008049827 A2 | 5/2008 |
| WO | 2008116864 A1 | 10/2008 |
| WO | 2008138989 A1 | 11/2008 |
| WO | 2009016139 A1 | 2/2009 |
| WO | 2009020473 A1 | 2/2009 |
| WO | 2009087155 A1 | 7/2009 |
| WO | 2009087156 A1 | 7/2009 |
| WO | 2009098173 A1 | 8/2009 |
| WO | 2009124372 A1 | 10/2009 |

* cited by examiner

*Primary Examiner* — Jason M Greene
*Assistant Examiner* — Anthony Shumate
(74) *Attorney, Agent, or Firm* — Mark Goldberg

(57) ABSTRACT

The present invention relates to an integrated membrane/absorbent/adsorbent process and system for removal of mercury and sulfur compounds from natural gas on a ship that houses natural gas purification equipment. First mercury and most of the sulfur compounds are removed by an adsorbent bed and then the natural gas stream passes through a membrane unit to produce a partially purified natural gas residue stream to be dried and then liquefied and a carbon dioxide permeate stream that can be used as a fuel gas.

7 Claims, No Drawings

NATURAL GAS PURIFICATION SYSTEM

CROSS-REFERENCE TO RELATED APPLICATION

This application claims priority from Provisional Application No. 61/359,920 filed Jun. 30, 2010, the contents of which are hereby incorporated by reference.

BACKGROUND OF THE INVENTION

This invention relates to a process and system for removing impurities from natural gas in a floating environment, such as on a ship. More specifically, the invention relates to an integrated membrane/adsorbent/absorbent system for removal of mercury, hydrogen sulfide, water and carbon dioxide from natural gas on a ship that houses natural gas purification equipment.

In an LNG (Liquefied Natural Gas) plant where natural gas is cooled to a very low temperature of about −160° C., which is the normal boiling point of methane, carbon dioxide content in the feed gas stream must be reduced to less than 50 ppmv before liquefaction to avoid formation of dry ice within the system. Commercially this can be achieved by using a physical or chemical solvent absorption process such as contacting the natural gas with an amine solvent to remove the carbon dioxide, which is then followed with the natural gas being sent through a molecular sieve unit for dehydration.

There has been a renewed interest in floating liquefied natural gas (FLNG) systems as a way to develop stranded gas fields, isolated and remote from land. These fields generally are too small for permanent platform installation. An FLNG system will use a ship or barge to house necessary recovery, gas treatment, liquefaction and offloading equipment. Compared to a land based LNG plant, an FLNG system will have a greater need for a modular design to minimize the equipment footprint and weight. An additional challenge for FLNG systems is the effect of sea motion on the performance of processing equipment, especially for systems containing liquid. The removal of carbon dioxide by use of an amine system can be impacted by a loss of efficiency and reliability from rocking and tilting of the column internal components. While both membrane and TSA systems have been used commercially on offshore fixed and floating platforms, no operating experience exists for amine systems in FLNG service.

Depending on the amount of carbon dioxide and the volume of the inlet gas stream, membrane processes have been used to remove the bulk of the carbon dioxide in front of a downstream amine unit followed by molecular sieve adsorbents. One of the benefits of a membrane-amine-adsorbent hybrid system is the reduction of the size of amine system that is needed and as well as a reduction in its energy consumption. Adsorption systems have also been used for front-end feed purification for LNG plants. TSA (Temperature Swing Adsorption) processes employing molecular sieves such as 4A or 13X zeolites can remove both carbon dioxide and water from natural gas streams. A growing application for a TSA process is for peak shaving of pipeline gas, where a portion of the pipeline gas is converted and stored as LNG when demand is low. In the TSA process, the adsorbed carbon dioxide and water in the molecular sieve column are regenerated using a hot purge gas, typically from the feed or the product gas stream. The hot regeneration gas is cooled to knock out most of the water and is then returned to the pipeline. The carbon dioxide removed from the adsorbent, which is not condensable at the cooler temperature, is also returned to the pipeline.

In general, membrane processes that use carbon dioxide-selective polymers such as cellulose acetate can not economically generate a residue or product stream that meets the specification levels of less than 50 ppmv $CO_2$, as the process is limited by the driving force or the $CO_2$ partial pressure across the membrane. Molecular sieve TSA processes typically can not economically handle a feed stream with more than 3% $CO_2$, since the required size of the adsorbent beds become too large and the necessary regeneration gas flow then becomes prohibitively large. Furthermore, for an FLNG application, there is no existing solution to treat or recycle the effluent regeneration gas, which contains the $CO_2$ removed from the feed stream.

Another impurity that requires removal is hydrogen sulfide and more generally other sulfur compounds that may be found in a natural gas stream. When a membrane system is used to remove carbon dioxide from natural gas, the permeate that contains carbon dioxide may be burned as fuel gas or blended into a fuel gas stream. However, if the untreated natural gas contains hydrogen sulfide, the permeate that passes through the membrane will have higher concentrations of hydrogen sulfide. The concentration of hydrogen sulfide in the permeate stream may render it unsuitable for fuel gas due to environmental concerns and other considerations. A hybrid system may be considered unsuitable for $H_2S$ containing natural gas. An alternative may be a very large solvent based purification unit that would not be feasible to use when there are stringent limitations on space and weight allocated to the purification process.

In order to use a hybrid purification scheme, the hydrogen sulfide concentration in the membrane permeate stream needs to be significantly reduced. The present invention provides the use of a solid adsorbent bed to remove a majority of the hydrogen sulfide from the gas before it is routed to the membrane separation unit. Then the permeate product will have an acceptable amount of hydrogen sulfide and other sulfur compounds for use in fuel gas.

Frequently, natural gas is contaminated with mercury. In the processing of natural gas for LNG applications, it is necessary to reduce the level of mercury in the natural gas to very low levels. In previous systems, activated carbon beds have been used for removal of mercury. However, activated carbon beds are only usable on streams of purified and dried gas. Many current offshore LNG applications are located in parts of the world where there are high levels of mercury in natural gas. When natural gas with elevated levels of mercury needs to pass through the rest of the purification process before being removed in conventional activated carbon beds, there is a risk that the mercury may condense and increase the risk of failure to welding seams. Also, there is an increased risk that mercury content will increase the hazard levels for equipment entry during maintenance. Activated carbon beds require relatively frequent replacements.

There exists a need to develop an improved process or integrated processes that can remove carbon dioxide and moisture to meet FLNG requirements. The desired processes should be compact and robust, and not susceptible to producing natural gas that is below specification due to winds and waves.

SUMMARY OF THE INVENTION

The present invention provides a process of treating a natural gas stream comprising sending a natural gas stream to a ship, barge or platform that is carrying equipment for purification of natural gas. The natural gas stream is sent to a non-regenerative adsorbent bed for removal of mercury followed by removal of hydrogen sulfide in a purification unit.

Then the purified gas is sent to a membrane unit on the ship, barge or platform to remove carbon dioxide and other impurities from the natural gas stream and to produce a partially purified natural gas stream. The partially purified natural gas stream is sent to a liquid solvent process unit for further removal of carbon dioxide and hydrogen sulfide. Finally, the gas is sent to a molecular sieve dehydration unit for removal of water prior to the gas being chilled in the liquefaction process. A portion of the partially purified natural gas stream may be used to regenerate the sulfur purification unit.

DETAILED DESCRIPTION OF THE INVENTION

In this invention, mercury is initially removed from a natural gas stream followed by removal of hydrogen sulfide as well as other sulfur compounds that may be present in a natural gas stream. In some installations it is possible that the hydrogen sulfide and other sulfur impurities could be first removed followed by the removal of mercury. Then membrane and absorption processes are combined to remove $CO_2$ from a natural gas stream to below 50 ppm. The inlet gas stream is first processed by a membrane unit to lower the $CO_2$ level to below about 3%. The product gas or the residue gas from the membrane is sent to a solvent absorbent unit to further reduce the $CO_2$ to below 50 ppmv and to further remove hydrogen sulfide to bring the levels of those impurities within specification limits. Then the gas stream is sent through a molecular sieve adsorbent bed to reduce the level of water vapor to the levels required for liquefaction of the natural gas.

The adsorbent used for removal of mercury is preferably a copper oxide or copper sulfide on a support such as alumina. The copper oxide adsorbent is an agglomeration which is preferably produced by using a transition-phase alumina; an oxysalt of a transition metal; an alkali metal compound (AM) and active water (AW).

Various sulfur species are removed, including hydrogen sulfide, ethyl sulfide, methyl mercaptan, ethyl mercaptan, and other sulfur compounds. Carbonyl sulfide is a common contaminant that needs to be removed.

Other suitable adsorbents as known to those of ordinary skill in the art may also be used for removal of mercury.

The same adsorbent may be used for removal of sulfur containing compounds or a different adsorbent may be used that has the capacity to remove sufficient sulfur compounds to meet the specifications.

In the preferred embodiment of the invention, a natural gas feed is first sent through a mercury removal adsorbent bed to remove mercury and mercury compounds that can be damaging to equipment and environmentally hazardous. Then, the natural gas feed is sent through a regenerative adsorbent unit (TSA) to remove sulfur containing compounds such as hydrogen sulfide. The partially purified natural gas stream is then sent to a membrane unit that produces a permeate gas containing a majority of the carbon dioxide and a mostly purified natural gas stream that is sent to a solvent unit to remove most of the rest of the sour gases including carbon dioxide and hydrogen sulfide. The permeate gas can be routed to be used as fuel. A portion of residue gas that is now low in sulfur content can be used for the regeneration of the sulfur compound adsorbent unit. This portion of residue gas recovers adsorbed $H_2S$ from the adsorbent and then it may be combined with the rest of the residue gas for further purification in the solvent based acid gas removal unit. As a result of this scheme in which a large proportion of the carbon dioxide and sulfur compounds are removed by the adsorbent beds and the membrane unit, the size of the solvent based unit remains within practical limits and nearly all sulfur compounds, including hydrogen sulfide are removed together with the other acid gases.

The invention claimed is:

1. A process of treating a natural gas stream comprising:
   a) sending said natural gas stream to a ship, barge or platform;
   b) then sending said natural gas stream to a membrane unit on said ship, barge or platform to remove carbon dioxide and other impurities from said natural gas stream to produce a permeate stream comprising a higher concentration of said carbon dioxide and other impurities and a residue stream comprising a partially purified natural gas stream that has a lower concentration of said carbon dioxide and other impurities;
   c) then sending said partially purified natural gas stream to a solvent based absorption unit to remove carbon dioxide and additional sulfur containing impurities to produce a purified natural gas stream; and
   d) then sending said purified natural gas stream to an adsorbent bed to remove water vapor from said purified natural gas stream prior to liquefaction of said natural gas stream.

2. The process of claim 1 wherein said natural gas stream from step a) is sent to an adsorbent bed to remove mercury compounds.

3. The process of claim 1 wherein said natural gas stream from step a) is sent to an adsorbent bed to remove sulfur containing impurities.

4. The process of claim 2 wherein said adsorbent bed that removes mercury compounds is a copper oxide or copper sulfide on alumina.

5. The process of claim 3 wherein said sulfur containing impurities are selected from the group consisting of hydrogen sulfide, ethyl sulfide, methyl mercaptan, ethyl mercaptan and carbonyl sulfide.

6. The process of claim 4 wherein said adsorbent bed removes sulfur containing impurities in addition to said mercury compounds.

7. The process of claim 1 wherein said permeate stream is sent to be used as fuel gas.

* * * * *